(12) United States Patent
Pelka

(10) Patent No.: US 10,274,783 B2
(45) Date of Patent: Apr. 30, 2019

(54) DIRECT-VIEW LED BACKLIGHT WITH GRADIENT REFLECTIVE LAYER

(71) Applicant: Pelka & Associates, Inc., Los Angeles, CA (US)

(72) Inventor: David Gerard Pelka, Los Angeles, CA (US)

(73) Assignee: Pelka & Associates, Inc., Los Angeles, CA (US)

( * ) Notice: Subject to any disclaimer, the term of this patent is extended or adjusted under 35 U.S.C. 154(b) by 0 days.

(21) Appl. No.: 15/962,947

(22) Filed: Apr. 25, 2018

(65) Prior Publication Data

US 2018/0321557 A1 Nov. 8, 2018

Related U.S. Application Data

(60) Provisional application No. 62/502,407, filed on May 5, 2017.

(51) Int. Cl.
*F21V 11/14* (2006.01)
*G02F 1/1335* (2006.01)

(52) U.S. Cl.
CPC .. *G02F 1/133603* (2013.01); *G02F 1/133605* (2013.01); *G02F 1/133606* (2013.01); *G02F 1/133608* (2013.01); *G02F 2001/133614* (2013.01)

(58) Field of Classification Search
CPC ........... F21V 3/049; F21V 9/40; F21V 11/141
USPC .................. 362/97.1, 97.2, 217.03, 354, 225
See application file for complete search history.

(56) References Cited

U.S. PATENT DOCUMENTS

| | | | |
|---|---|---|---|
| 2,337,745 A | 12/1943 | Garstang | |
| 2,433,690 A | 12/1947 | Garstang | |
| 2,510,346 A | 6/1950 | Nitardy | |
| 2,741,694 A | 4/1956 | Thomstad et al. | |
| 3,860,903 A | 1/1975 | Van Steenhoven | |
| 4,254,453 A * | 3/1981 | Mouyard | G09F 13/22 340/815.54 |
| 4,271,408 A * | 6/1981 | Teshima | G08G 1/095 340/815.45 |
| 4,336,580 A | 6/1982 | Mouyard et al. | |
| 4,345,308 A | 8/1982 | Mouyard et al. | |
| 4,418,378 A | 11/1983 | Johnson | |
| 4,485,377 A | 11/1984 | Claus et al. | |
| 4,622,625 A | 11/1986 | Becker et al. | |
| 4,688,156 A | 8/1987 | Suzuki et al. | |
| 4,783,920 A | 11/1988 | Muller-Tolk | |
| 4,914,731 A | 4/1990 | Chen | |
| 4,935,665 A | 6/1990 | Murata | |
| 4,970,812 A | 11/1990 | Tanaka et al. | |
| 5,093,768 A | 3/1992 | Ohe | |
| 5,126,886 A | 6/1992 | Richardson et al. | |
| 5,226,723 A * | 7/1993 | Chen | G09F 9/33 362/241 |

(Continued)

*Primary Examiner* — Ismael Negron
(74) *Attorney, Agent, or Firm* — Knobbe, Martens, Olson & Bear, LLP

(57) ABSTRACT

A backlight unit includes an array of light sources arranged on at least one printed circuit board, a reflective member including a plurality of holes provided over the array of light sources such that light from the light sources passes through the holes, and a gradient reflective layer provided over the reflective member to modify a distribution of light received from the array of light sources and the reflective member.

33 Claims, 18 Drawing Sheets
(11 of 18 Drawing Sheet(s) Filed in Color)

(56) References Cited

U.S. PATENT DOCUMENTS

| | | | |
|---|---|---|---|
| 5,390,436 A * | 2/1995 | Ashall | G02B 6/0043 |
| | | | 362/618 |
| 5,779,351 A | 7/1998 | Erickson et al. | |
| 5,813,751 A | 9/1998 | Shaffer | |
| 5,819,454 A * | 10/1998 | Rosenitsch | G09F 9/33 |
| | | | 40/452 |
| 6,106,137 A | 8/2000 | Adams et al. | |
| 6,416,201 B1 | 7/2002 | Strand et al. | |
| 6,783,263 B1 | 8/2004 | Cronk | |
| 7,068,332 B2 | 6/2006 | Liu et al. | |
| 7,093,955 B2 | 8/2006 | Sejkora et al. | |
| 7,156,539 B2 | 1/2007 | Cronk | |
| 7,165,868 B2 | 1/2007 | Citterio | |
| 7,175,329 B1 | 2/2007 | Chou | |
| 7,204,604 B2 * | 4/2007 | Chou | G02F 1/133608 |
| | | | 362/227 |
| 7,393,123 B2 | 7/2008 | Kasian et al. | |
| 7,434,977 B2 * | 10/2008 | Fukasawa | G02F 1/133603 |
| | | | 362/631 |
| 7,481,553 B2 | 1/2009 | Kim et al. | |
| 7,530,711 B2 | 5/2009 | Bang | |
| 7,549,760 B2 | 6/2009 | Jung et al. | |
| 7,566,146 B2 | 7/2009 | Jeon | |
| 7,588,345 B1 | 9/2009 | Davis et al. | |
| 7,604,365 B2 | 10/2009 | Chang | |
| 7,654,689 B2 * | 2/2010 | Chang | F21V 13/10 |
| | | | 362/240 |
| 7,780,312 B2 | 8/2010 | Han et al. | |
| 7,784,970 B2 | 8/2010 | Sun | |
| 7,997,771 B2 * | 8/2011 | Epstein | G09F 9/3026 |
| | | | 362/339 |
| 8,152,333 B2 | 4/2012 | Boyer | |
| 8,162,500 B2 | 4/2012 | Kim et al. | |
| 8,313,214 B2 | 11/2012 | Liang et al. | |
| 8,439,521 B2 | 5/2013 | Shimizu et al. | |
| 8,550,683 B2 | 10/2013 | Ho et al. | |
| 8,651,685 B2 | 2/2014 | Roberts et al. | |
| 8,690,380 B2 | 4/2014 | Sato et al. | |
| 8,742,435 B2 * | 6/2014 | Tanaka | F21V 13/02 |
| | | | 257/59 |
| 9,039,256 B2 | 5/2015 | Kung | |
| 9,123,267 B2 | 9/2015 | Rensmo | |
| 9,482,897 B2 * | 11/2016 | Kim | G02F 1/133606 |
| 9,739,462 B2 | 8/2017 | Georgitsis et al. | |
| 9,874,322 B2 | 1/2018 | Edmond et al. | |
| 9,880,345 B2 | 1/2018 | Kim et al. | |
| 9,989,212 B2 | 6/2018 | Dedick | |
| 2006/0164858 A1 | 7/2006 | Park et al. | |
| 2006/0245208 A1 | 11/2006 | Sakamoto et al. | |
| 2008/0192174 A1 | 8/2008 | Odake et al. | |
| 2009/0003002 A1 * | 1/2009 | Sato | G02B 6/0043 |
| | | | 362/341 |
| 2013/0058074 A1 | 3/2013 | Somei et al. | |
| 2013/0070440 A1 | 3/2013 | Levermore et al. | |
| 2018/0045396 A1 * | 2/2018 | Terashima | F21V 11/14 |

\* cited by examiner

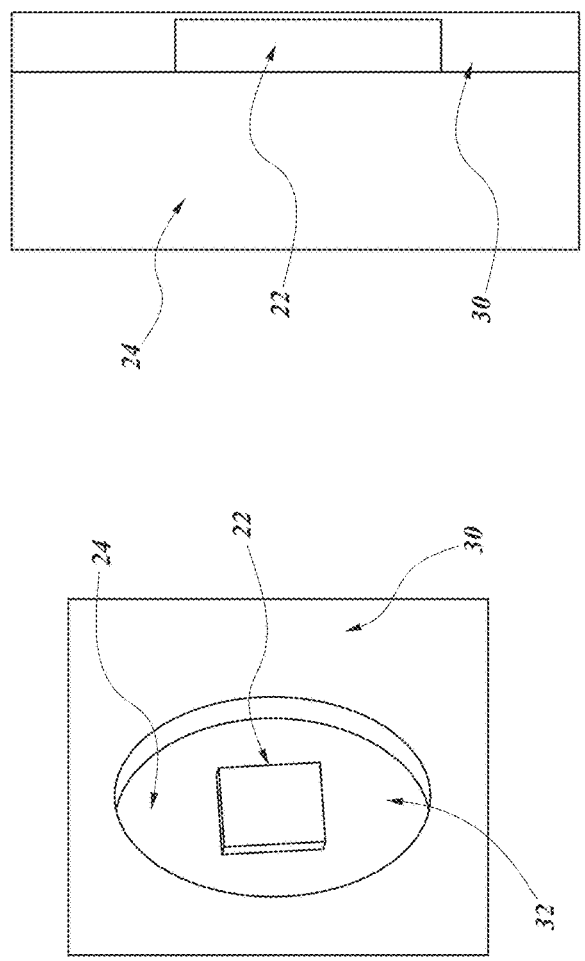

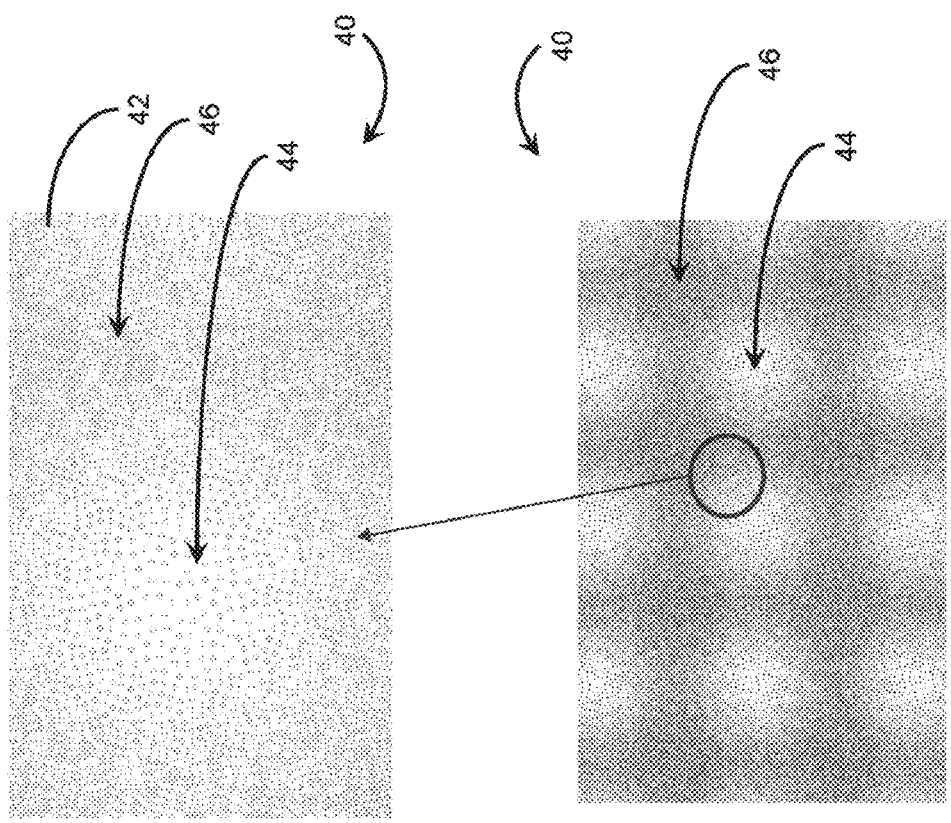

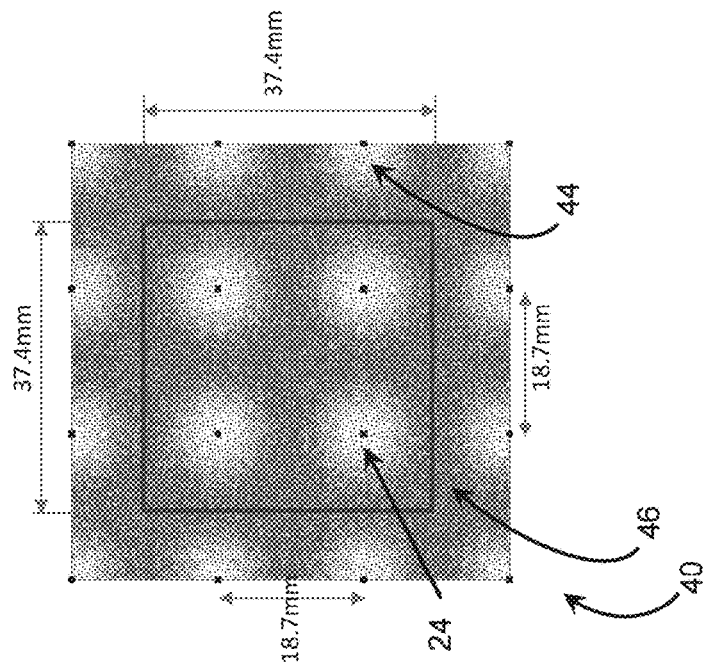
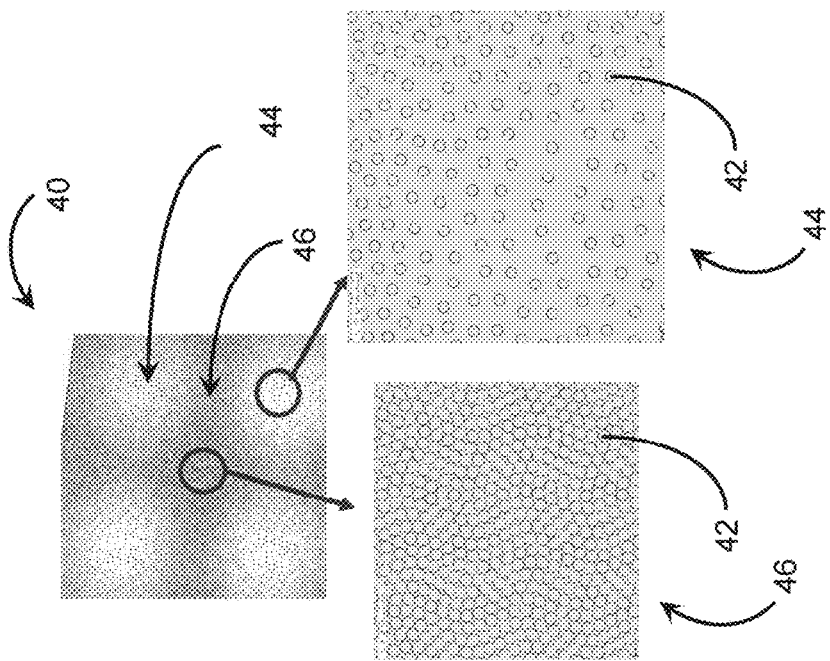

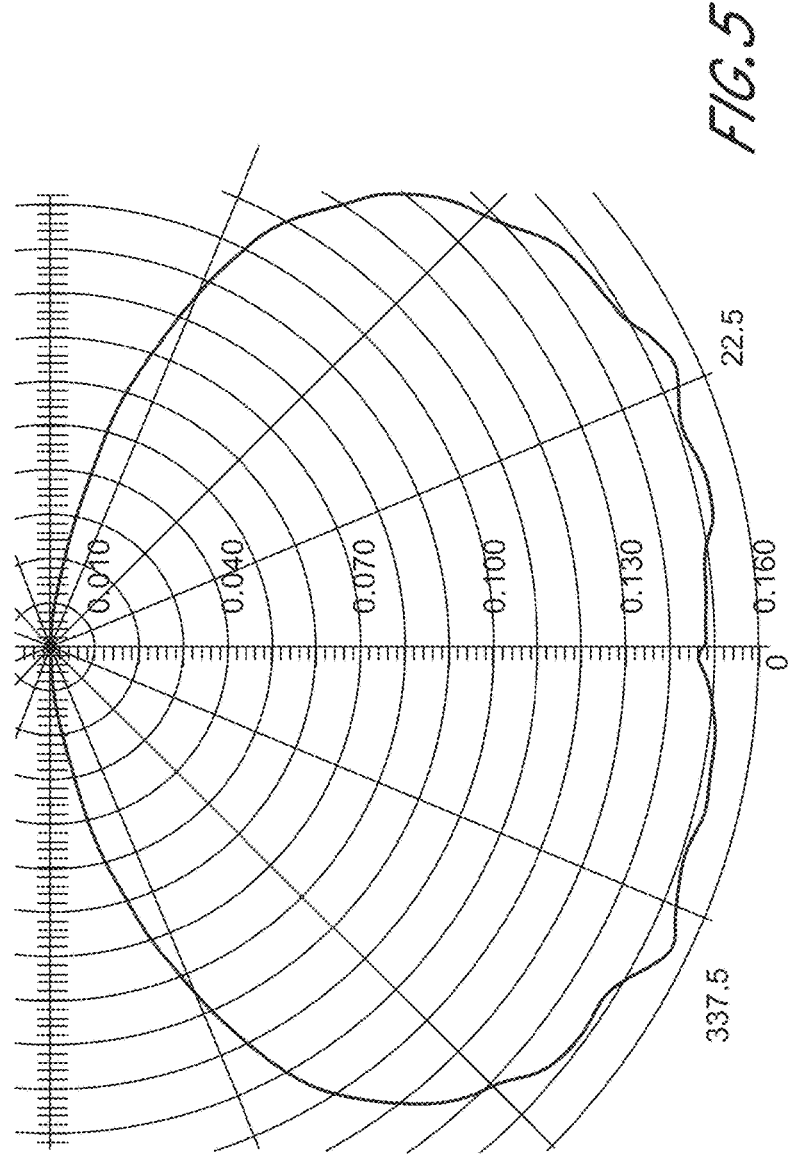

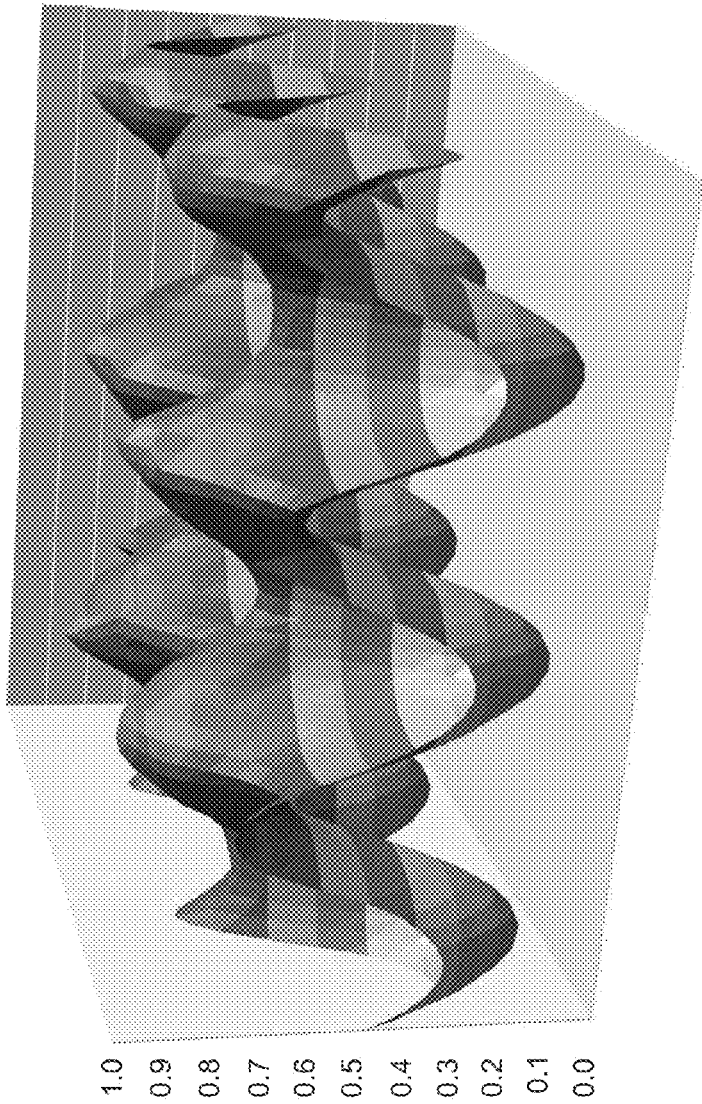

DIRECT-VIEW LED BACKLIGHT WITH GRADIENT REFLECTIVE LAYER

CROSS-REFERENCE TO RELATED APPLICATIONS

This application claims the benefit of priority to U.S. Provisional Appl. No. 62/502,407 filed May 5, 2017 which is incorporated in its entirety by reference herein.

BACKGROUND

Field

The present application is generally directed to systems and methods of providing light, and more specifically, to light-emitting, direct-view backlights for use with flat-screen displays.

Description of the Related Art

In the past decade, flat-screen televisions have gone from luxury-status to market domination that is so complete that cathode-ray tube (CRT) televisions have ceased production and old CRT sets cannot be given away. While plasma flat-screens are like CRTs in having emissive pixels, the pixels of liquid-crystal displays (LCDs) are passive, merely acting to rotate the polarization of light passing through them, so such pixels are placed between two orthogonal polarizers in order for the pixels to act as intensity modulators. Originally, flat-screen LCDs utilized waveguide-based backlights that were edge-illuminated by fluorescent tubes. As light-emitting diodes (LEDs) rapidly increased in brightness and efficacy, they replaced the fluorescent tubes while retaining the edge-illuminated waveguide. However, waveguides may be thick and heavy for large screen sizes, so that direct-view area backlights comprising hollow light boxes may be desirable because their lights are distributed all across the back area of the light box.

LED backlights are used for myriad applications including LCDs, reach-in refrigeration lighting, and general illumination (light fixtures). All of these applications have a throw distance (panel thickness) much less than the spacing between the LED sources. Since LEDs emit in a quasi-Lambertian manner, a diverging lens is used to spread the emitted light out across a large lateral area, with a lens that modifies the forward emitting angular distribution of the LED source into a mostly side-emitting angular distribution. The conventional art has focused almost exclusively on solutions with rotational symmetry. While some of these solutions predict near ideal uniformity in one dimension, they are fundamentally limited by étendue, specifically its skewness, from achieving near ideal uniformity in two dimensions. Example architectures of LED backlights are disclosed by U.S. Pat. No. 7,798,679, U.S. Pat. No. 8,227,969, and U.S. Pat. No. 8,328,395.

SUMMARY

In certain embodiments, a backlight unit is provided. The backlight unit comprises an array of light sources configured to emit light. The backlight unit further comprises a reflective layer comprising a plurality of holes configured to allow the light emitted from the array of light sources to propagate through the reflective layer. The backlight unit further comprises a gradient reflective layer configured to modify a distribution of light emitted from the gradient reflective layer.

In certain embodiments, a method of providing backlight for a display device is provided. The method comprises emitting light from an array of light sources. The method further comprises propagating at least a portion of the light emitted from the array of light sources through holes of a reflective layer. The method further comprises transmitting at least a portion of the light propagated through the holes of the reflective layer through a layer comprising an array of first regions having a first transmissivity and separated from one another by one or more second regions having a second transmissivity higher than the first transmissivity. The first regions are positioned above the light sources.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3B schematically illustrates a perspective view and a cross-sectional view of another example configuration of a light source of the array and a corresponding hole of the reflective layer in accordance with certain embodiments described herein.

FIGS. 4A-4C schematically illustrate an example gradient reflective layer in accordance with certain embodiments described herein.

FIG. 5 is a plot of an angular far-field intensity distribution of an example light source of the array of light sources in accordance with certain embodiments described herein.

FIGS. 9A-9C show some example simulation data for an example BLU in which the reflective layer comprises a diffusely reflective layer (e.g., highly diffusely film; having 90+% diffuse reflectivity) in accordance with certain embodiments described herein.

DETAILED DESCRIPTION

Direct-view area backlights can spread the light out uniformly to eliminate hot spots on the screen just over each LED light source, which is what LEDs without dedicated local lenses do not accomplish. As LEDs have matured, their increasing power output means that any particular illumination task may be achieved using fewer and fewer LEDs. However, when area backlights try to use fewer LEDs, especially with the 16:9 proportions of typical high-definition televisions, their illumination geometry becomes increasingly difficult to achieve uniform illumination in several ways.

First, locations intermediate between the LEDs are subject to a cosine to the third-power drop-off, which even at 60° off-axis is an 8:1 ratio. This power drop-off is over and above the lesser lateral intensity typical of LEDs. Second, an illumination lens is subject to inevitable scattering, due to imperfections inherent to the injection-molded lens material, which becomes more important as LED luminosity increases. This effect may superimpose hot spots upon the direct-light pattern which the lens produces, requiring compensation of that pattern with a central dark zone.

In some applications, these adverse factors may be dealt with by increasing the relative size of the illumination lens compared to that of the LED. LCD backlights, however, are generally an inch or less in thickness. To compete with organic LED (OLED) TVs, which are now beginning to appear in the market with smaller thicknesses, it is desirable to have LED backlight units with thicknesses of a few millimeters or less.

Figure 1:
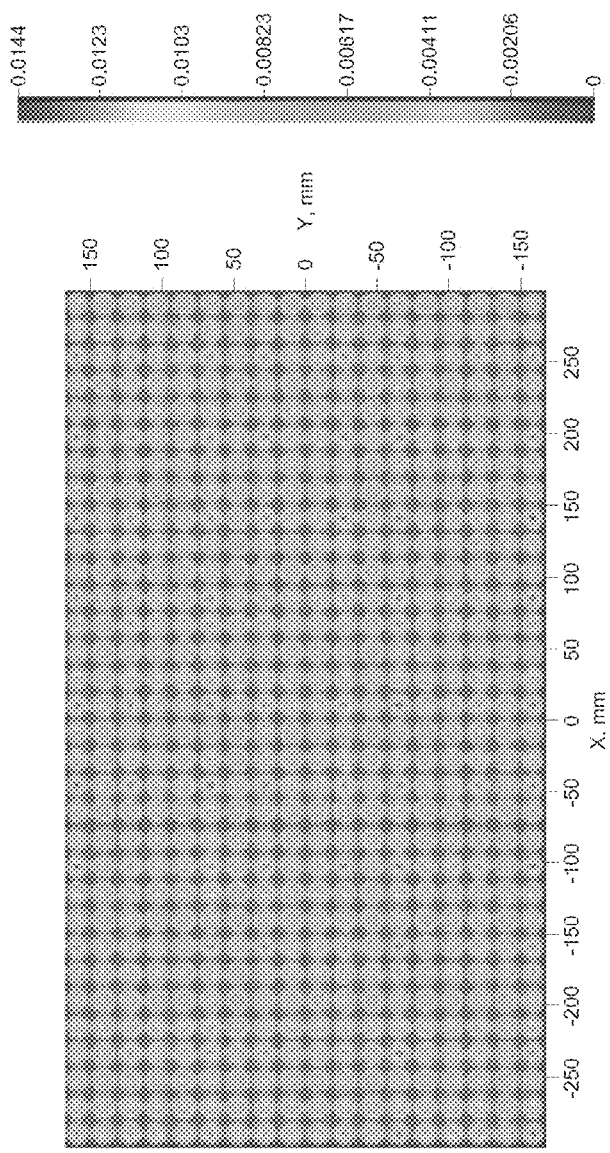
FIG. 1 shows an illuminance distribution for a back light unit (BLU) comprising an array of light sources without a gradient filter.

FIG. 1 shows an illuminance distribution for a back light unit (BLU) comprising an array of light sources (e.g., light-emitting diodes; LEDs) without a gradient reflective film. Without a gradient reflective film above the light sources, the illuminance has a spotty distribution, in that there is a high illuminance on top of every light source and a low illuminance (e.g., almost no light) in the spaces between the light sources.

In certain embodiments described herein, a gradient reflective film is used to reduce light extraction directly over the light sources by redirecting a portion of this light towards the reflective layer (e.g., at the bottom floor of the BLU). After one or more bounces, this light fills the space between light sources to provide a uniform illuminance distribution on the top of the BLU. For example, a BLU in accordance with certain embodiments described herein can have an LED array, a specular reflective film on the bottom, a top window with a variable reflection/transmission (e.g., a gradient reflective film), and a transmissive diffuser on the top of this window.

In modeling the illuminance distribution for a BLU comprising a gradient reflective film, the gradient reflective film can be approximated by assuming that the film does not have any absorption, but has a variable transmission T and variable reflection R (with R=1−T). In addition, such modeling can take into consideration multiple bounces of light between the top and bottom of the cavity, and such modeling can be used to optimize the transmission distribution across the cavity (e.g., to provide a predetermined level of uniformity). A large number of data points across the X/Y grid (e.g., the X/Y plane of the gradient reflective film) can be used to provide high spatial resolution.

Figure 2:
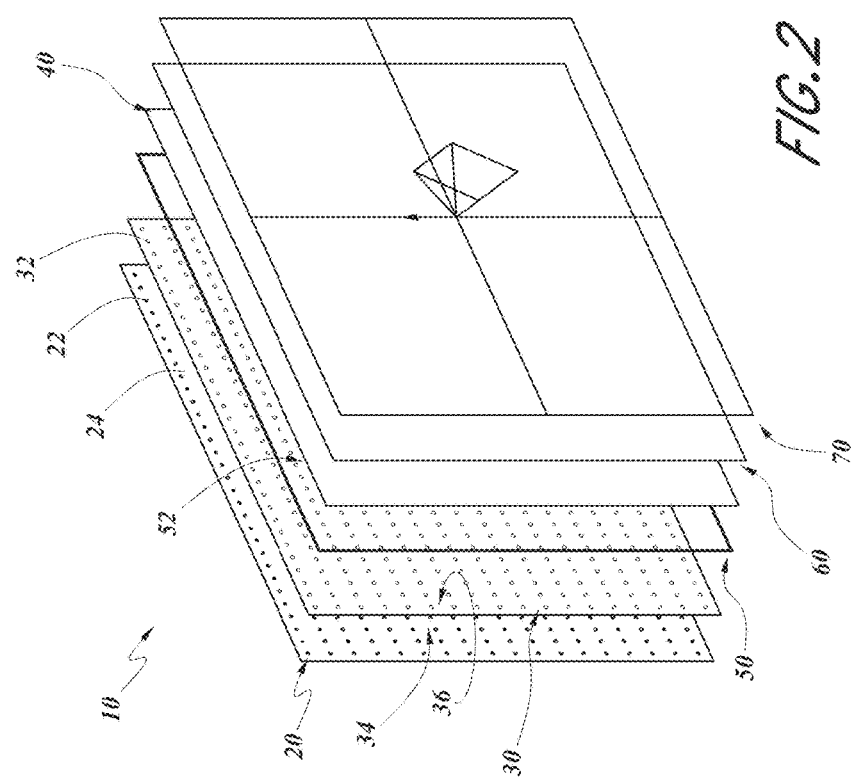
FIG. 2 schematically illustrates an example BLU in accordance with certain embodiments described herein.

FIG. 2 schematically illustrates an example BLU 10 in accordance with certain embodiments described herein. The BLU 10 can comprise an array 20 of light sources 22 (e.g., on one or more printed circuit boards 24 comprising circuitry and components to provide electrical power to the LEDs) configured to emit light, a reflective layer (e.g., film) 30 comprising a plurality of holes 32 configured to allow the light emitted from the array 20 of light sources 22 to propagate through the reflective layer 30 (e.g., from a first side 34 of the reflective layer 30 to a second side 36 of the reflective layer 30), a gradient reflective layer (e.g., film) 40 configured to modify the distribution of light emitted from the gradient reflective layer 40, and a frame 50. The reflective layer 30, the gradient reflective layer 40, and the frame 50 are bounding a region 52 (e.g., a hollow cavity). In certain embodiments, the BLU 10 can further comprise a transmissive diffusing layer (e.g., film) 60 configured to diffuse light emitted from the gradient reflective layer 40 propagating towards a receiver 70 (e.g., a liquid crystal display (LCD)).

In certain embodiments, the array 20 of light sources 22 comprises a planar array of LEDs arranged in a regular pattern. For example, the array 20 can comprise 576 LEDs mounted on one or more printed circuit boards (PCBs) 24 (e.g., with each LED having dimensions of 0.81 mm×0.81 mm×0.17 mm) and arranged in a rectilinear 18×32 pattern with a 18.7 mm pitch in both the X and Y directions and the PCB 24 having a Lambertian reflectivity (e.g., 50%, 80%). The LEDs can be configured to emit light having a predetermined wavelength or color distribution (e.g., centered at a particular wavelength such as 550 nm; having a tri-color distribution such as red-green-blue). In certain embodiments in which the array 20 comprises a blue LED array, the BLU 10 can comprise a quantum dot material (e.g., in a layer in place of the diffusing layer 60 shown in FIG. 2; within the diffusing layer 60 shown in FIG. 2) with the quantum dot material configured to convert blue light from the array 20 to white light.

In certain embodiments, the reflective layer 30 comprises a planar film generally parallel with the array 20 of light sources 22. In certain embodiments, the reflective layer 30 can be considered to be a bottom floor layer which at least partially defines a boundary of the region 52 (e.g., at least partially defines the cavity). The plurality of holes 32 of the reflective layer 30 can be arranged in the same regular pattern as are the light sources 22 (e.g., LEDs) of the array 20. Each hole 32 of the reflective layer 30 is positioned above a corresponding one of the light sources 22 (e.g., LEDs) of the array 20 such that light from the light source 22 propagates through the corresponding hole 32 above the light source 22. For example, the reflective layer 30 can be a white, opaque layer having a reflectivity (e.g., 90+%; up to 98%), and which can be specular (e.g., an enhanced specular reflector (ESR) film available from 3M Corp. of Maplewood, Minn.) or diffusive or Lambertian (e.g., available from White Optics LLC of New Castle, Del.). In certain embodiments, the holes 32 are generally perpendicular to the plane of the reflective layer 30 (e.g., formed by laser drilling the reflective layer 30; formed by mechanical drilling or mechanical punching of holes through the reflective layer 30), although the holes 32 can have other angles of inclination relative to the reflective layer 30 and other fabrication techniques may be alternatively be used.

Figure 3A:
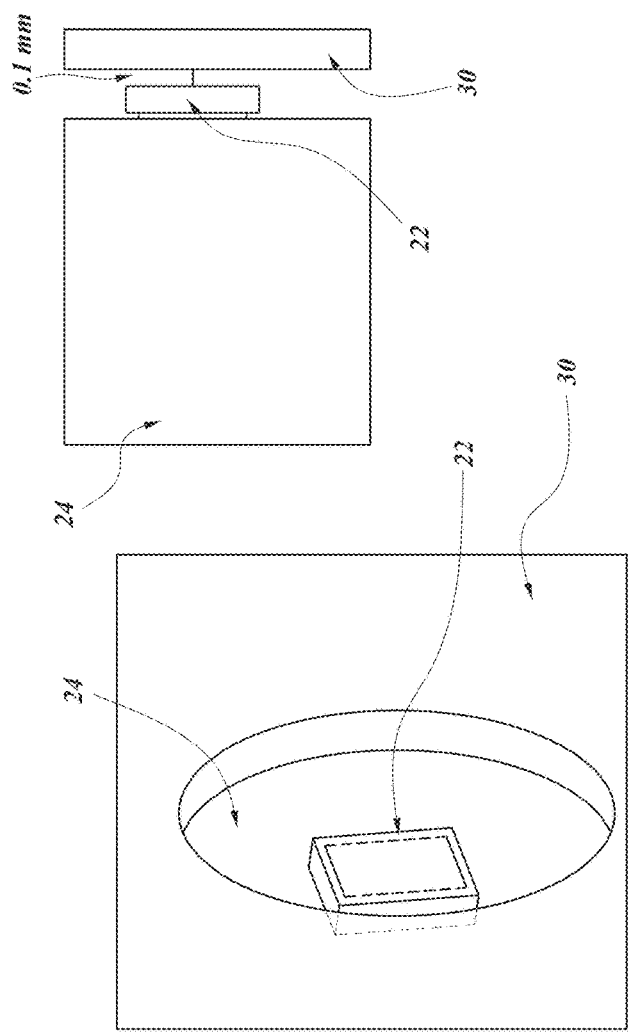
FIG. 3A schematically illustrates a perspective view and a cross-sectional view of an example configuration of a light source of the array and a corresponding hole of the reflective layer in accordance with certain embodiments described herein.

FIG. 3A schematically illustrates a perspective view and a cross-sectional view of an example configuration of a light source 22 (e.g., an LED) of the array 20 and a corresponding hole 32 of the reflective layer 30 in accordance with certain embodiments described herein. For example, as shown in FIG. 3A, the light source 22 is mounted to the PCB 24 and the hole 32 of the reflective layer 30 (e.g., film) is generally circular and has a diameter of 2.5 mm, while other shapes and sizes of the hole 32 may also be used in accordance with certain embodiments described herein. In certain embodiments, the reflective layer 30 is positioned above and spaced away from the array 20 with a predetermined distance between the reflective layer 30 and the array 20, such that the light sources 22 do not extend into the holes 32. For example, as shown in FIG. 3A, the reflective layer 30 is spaced above the light source 22 (e.g., LED) by a distance of 0.1 mm, while other distances may also be used in accordance with certain embodiments described herein. In certain embodiments, the array of light sources are affixed to one or more PCBs 24 having a surface facing the reflective layer 30, and the surface has a reflectivity greater than 90%.

FIG. 3B schematically illustrates a perspective view and a cross-sectional view of another example configuration of a light source 22 (e.g., an LED) of the array 20 and a corresponding hole 32 of the reflective layer 30 in accordance with certain embodiments described herein. In certain embodiments, the holes 32 are configured to fit over at least a portion of the light sources 22 of the array 20 such that the light sources 22 extend at least partially into the holes 32, an example of which is schematically illustrated by FIG. 3B. For example, as shown in FIG. 3B, the light source 22 comprises an LED having a height of 0.17 mm and is mounted to the PCB 24 (e.g., Lambertian reflector; reflectivity of 50%) and the hole 32 of the reflective layer 30 (e.g., reflective Lambertian film; reflectivity of 98%) has a thickness (e.g., 0.18 mm; 0.2 mm) that is larger than the height of the LED and that is affixed (e.g., laminated; using adhesive) on the PCB 24.

In certain embodiments, the gradient reflective layer 40 comprises a planar film generally parallel with the reflective layer 30 and positioned above the reflective layer 30. The gradient reflective layer 40 has a transmittance function which varies across the area of the gradient reflective layer 40. For example, the gradient reflective layer 40 can comprise poly(methyl methacrylate) ("PMMA") film (e.g., with a thickness of 0.25 mm). In certain embodiments, the gradient reflective layer 40 can comprise a plurality of features 42 with a predetermined size and/or density across the area of the gradient reflective layer 40, the plurality of features 42 comprising at least one of: a plurality of reflective dots, a plurality of indentations extending partially through the thickness of the gradient reflective layer 40, a plurality of holes extending completely through the thickness of the gradient reflective layer 40, or a plurality of protrusions (e.g., structures sputter coated onto the gradient reflective layer 40 or via means of chemical vapor deposition on selected spatial areas of the gradient reflective layer 40) extending from one or both of a first side (e.g., top side) or a second side (e.g., bottom side) of the gradient reflective layer 40. The plurality of features 42 can be, shaped, positioned, and/or patterned across the area of the gradient reflective layer 40 to alter the optical properties of the gradient reflective layer 40 (e.g., at least one of the reflectance function, transmittance function, or absorption function across the area of the gradient reflective layer 40) so as to yield a desired uniformity and efficiency of light emitted from the gradient reflective layer 40. For example, in certain embodiments, select chemical vapor deposition (CVD) techniques can be used to yield a gradient reflective layer 40 (e.g., which can serve as a spatially determined gradient filter).

FIGS. 4A-4C schematically illustrate an example gradient reflective layer 40 in accordance with certain embodiments described herein. For example, the gradient reflective layer 40 can comprise a PMMA layer having a thickness of 0.25 mm, a specular reflectivity of 99%, and a plurality of features 42 (e.g., holes or dots) which are substantially clear (e.g., transmittance greater than 99%). As shown in FIGS. 4A-4C, the holes can be distributed with a varying density across the gradient reflective layer 40 to form a regular array of low transmissivity regions 44 (e.g., with lower density of holes) separated from one another by one or more high transmissivity regions 46 (e.g., with higher density of holes). For example, the low transmissivity regions 44 can be positioned generally above the light sources 22 (e.g., LEDs) and can be spaced from one another by 18.7 mm. As schematically illustrated by FIGS. 4A-4C, the low transmissivity regions 44 are less dark than the high transmissivity regions 46.

In certain other embodiments, the low transmissivity regions 44 and high transmissivity regions 46 can be formed by a plurality of high reflectivity features 42 (e.g., dots) on a high transmittance film, such that the low transmissivity regions 44 have higher densities of these features 42 while the high transmissivity regions 46 have lower densities of these features 42. The size, shape, and distribution of the low transmissivity regions 44 and high transmissivity regions 46 can be selected to produce a predetermined uniformity and efficiency of light output from the BLU 10.

In certain embodiments, the frame 50 is positioned between the reflective layer 30 and the gradient reflective layer 40 (e.g., around a perimeter of one or both of the reflective layer 30 and the gradient reflective layer 40). The frame 50, the reflective layer 30, and the gradient reflective layer 40 generally bound a region 52 (e.g., hollow cavity) through which the light propagates before being emitted from the gradient reflective layer 40. The frame 50 can comprise one or more reflective surfaces (e.g., mirror surfaces) bounding at least a portion of the region 52. For example, the region 52 can comprise a hollow cavity having dimensions of 336 mm×598 mm and can have a thickness of 2.8 mm. In certain embodiments, the frame 50 is configured to reduce leakage of light from the region 52 that does not propagate through the gradient reflective layer 40. For example, the frame 50 can comprise ESR film (e.g., enhanced specular reflecting film having a reflectivity greater than 98%, available from 3M Corp.).

In certain embodiments, the transmissive diffusing layer 60 comprises a planar film generally parallel with the gradient reflective layer 40 and is positioned above the gradient layer 40. For example, the transmissive diffusing layer 60 can comprise Luminit 60 available from Luminit, LLC of Torrance, Calif. In certain embodiments in which the array 20 comprises a blue LED array, the diffusing layer 60 can comprise a quantum dot material configured to convert blue light from the array 20 to white light.

As described more fully below, the various attributes (e.g., dimensions and operating characteristics) of the components of the BLU 10 can be optimized to provide a predetermined illuminance distribution. In certain embodiments, these attributes can be selected so that the BLU 10 exhibits an illuminance distribution with a desired level of uniformity and a desired level of intensity (e.g., selected to maximize illuminance uniformity and optical efficiency).

Figure 6B:
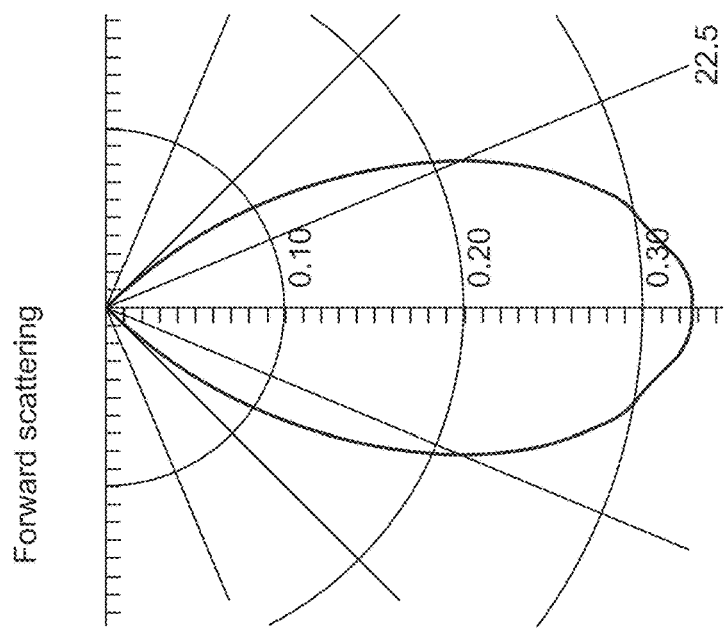
FIGS. 6A and 6B are plots of an angular intensity distribution for reflected light (e.g., backward scattering) and for transmitted light (e.g., forward scattering), respectively, for an example transmissive diffusing layer in accordance with certain embodiments described herein.
Figure 6A:
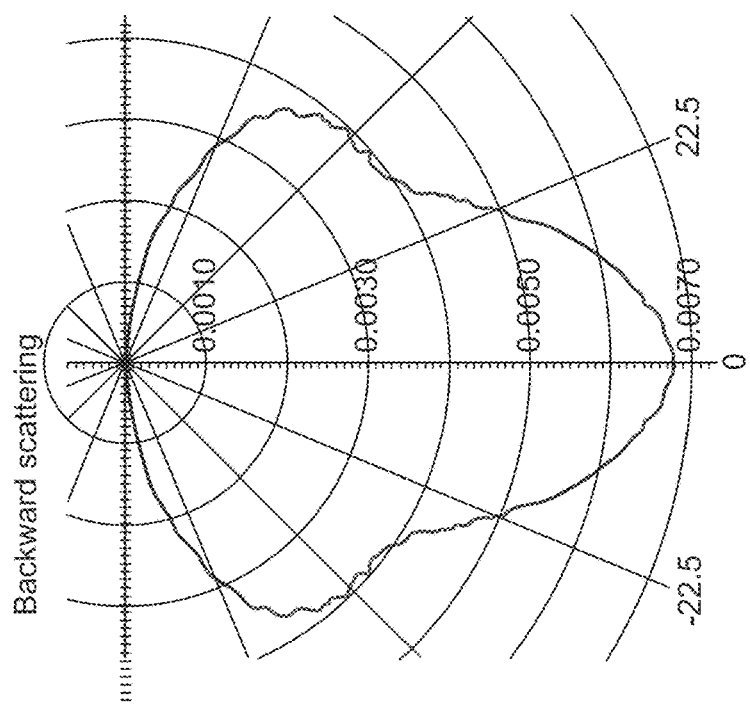

FIG. 5 is a plot of an angular far-field intensity distribution of an example light source 22 (e.g., LED) of the array 20 of light sources 22 in accordance with certain embodiments described herein. FIGS. 6A and 6B are plots of an angular intensity distribution for reflected light (e.g., backward scattering) and for transmitted light (e.g., forward scattering), respectively, for an example transmissive diffusing layer 60 in accordance with certain embodiments described herein.

Figure 7A:
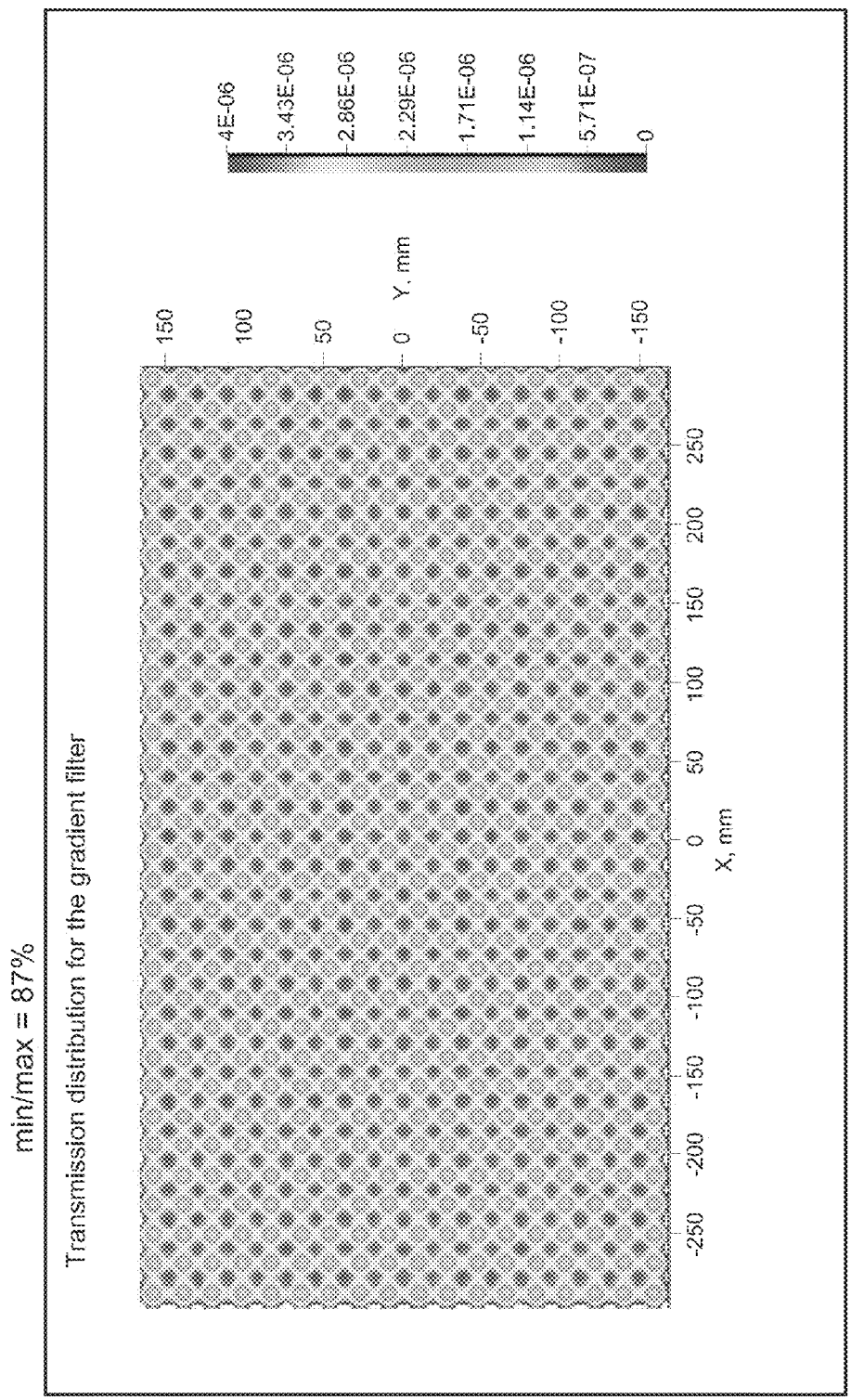
FIGS. 7A-7C show some example simulation data for an example BLU in which the reflective layer comprises a specular reflective film in accordance with certain embodiments described herein.
Figure 7B:
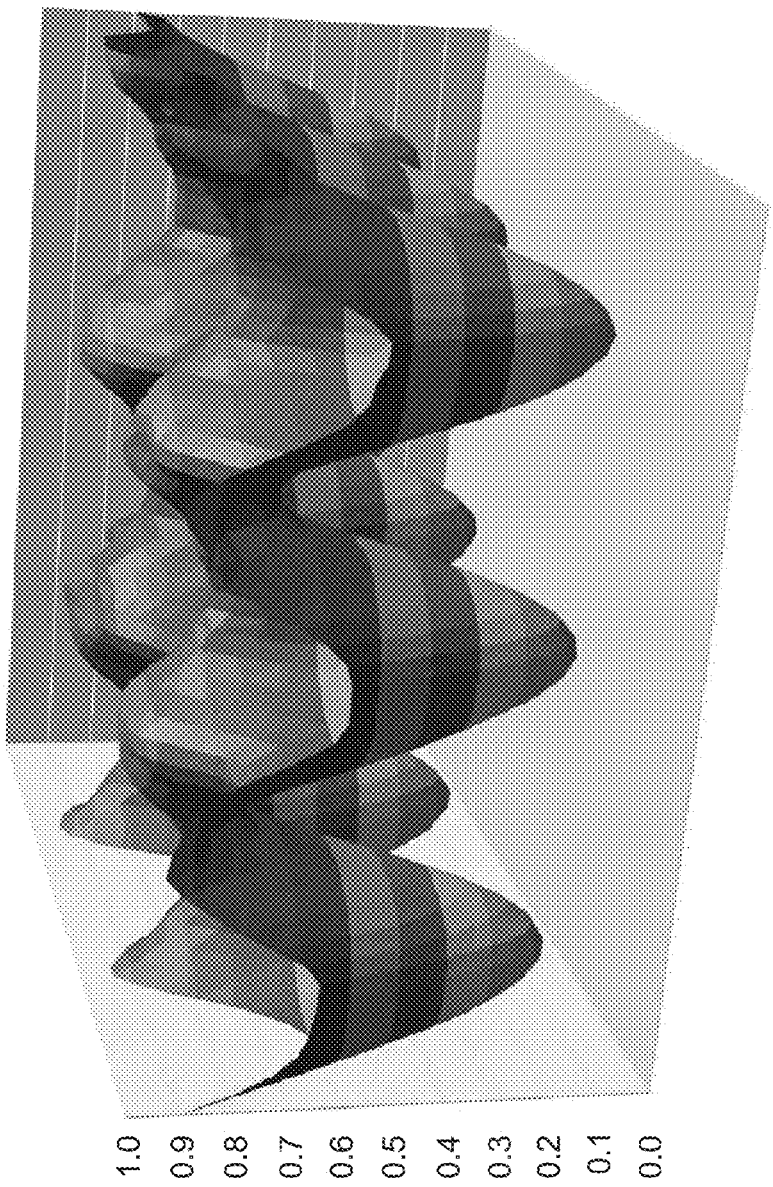
Figure 7C:
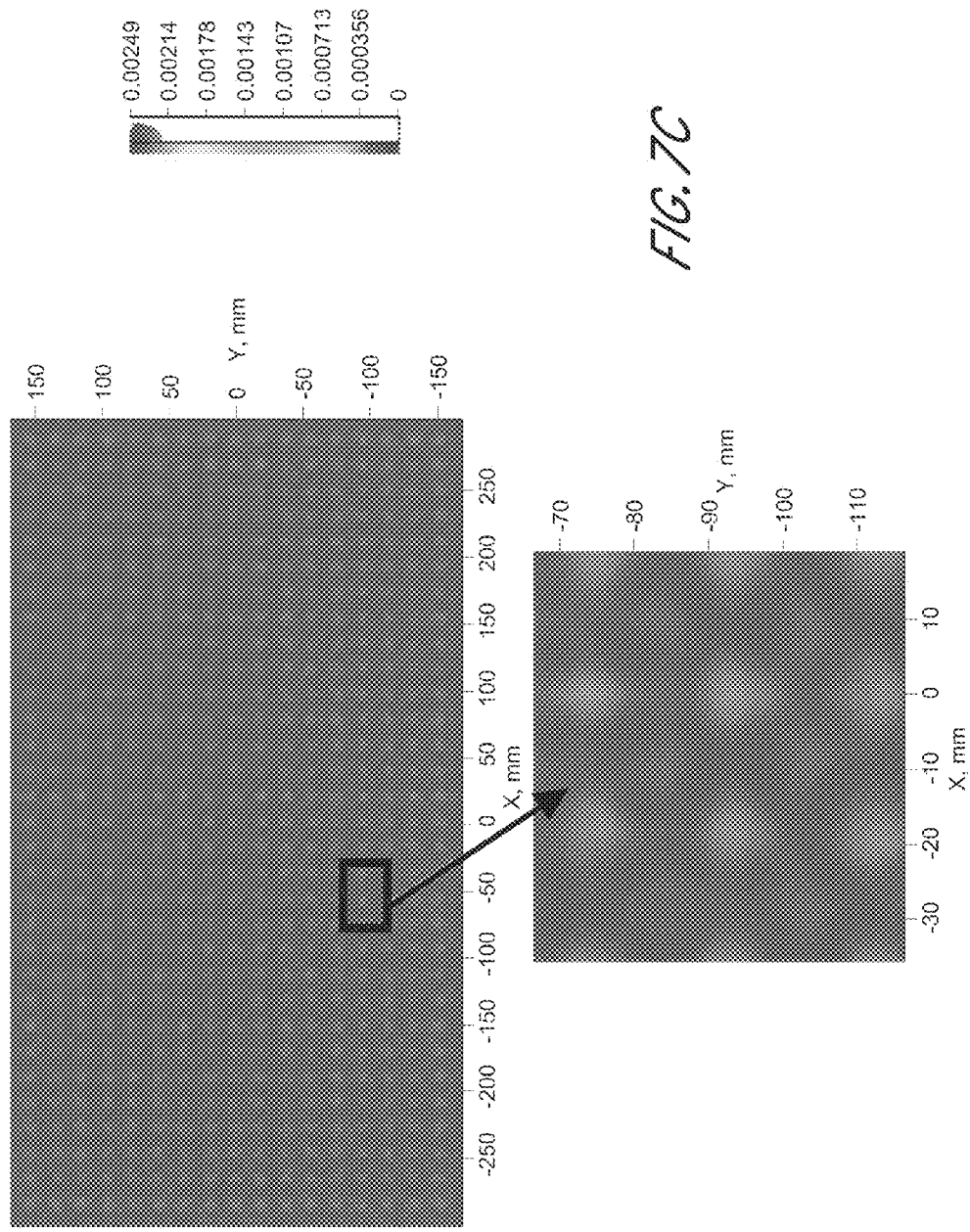

FIGS. 7A-7C show some example simulation data for an example BLU 10 in which the reflective layer 30 comprises a specular reflective film in accordance with certain embodiments described herein. The simulation was calculated using a receiver pixel size of 2 mm×2 mm, 28.8 million light rays, computation noise of 4.3%, holes 32 having a 2.0 mm diameter in the reflective layer 30, a distance between the array 20 of light sources 22 (e.g., LEDs) and the reflective layer 30 of 0.1 mm. FIG. 7A is an example transmission distribution and FIG. 7B is an example transmission spatial distribution for an example gradient reflective layer 40 in accordance with certain embodiments described herein. In certain embodiments, as shown in FIGS. 7A-7B, the transmittance can be at relative minima (e.g., lowest) in the brightest spatial regions (e.g., directly over the LED sources 22) and can be at relative maxima (e.g., highest) in the least bright spatial regions (e.g., regions between the LED sources 22).

FIG. 7C shows an example illuminance distribution for light emitted from the transmissive diffusing layer 60 of the example BLU 10 in accordance with certain embodiments described herein. The illuminance distribution of FIG. 7C has a high uniformity (e.g., min/max=87%) and a high efficiency (e.g., 81.8%). Residual non-uniformity visible in FIG. 7C has extremely low contrast (e.g., contrast=(max−min)/(max+min)=0.07) and may be further reduced by tuning the reflection/transmission distribution of the gradient reflective layer 40 across the area of the BLU 10.

Figure 8A:
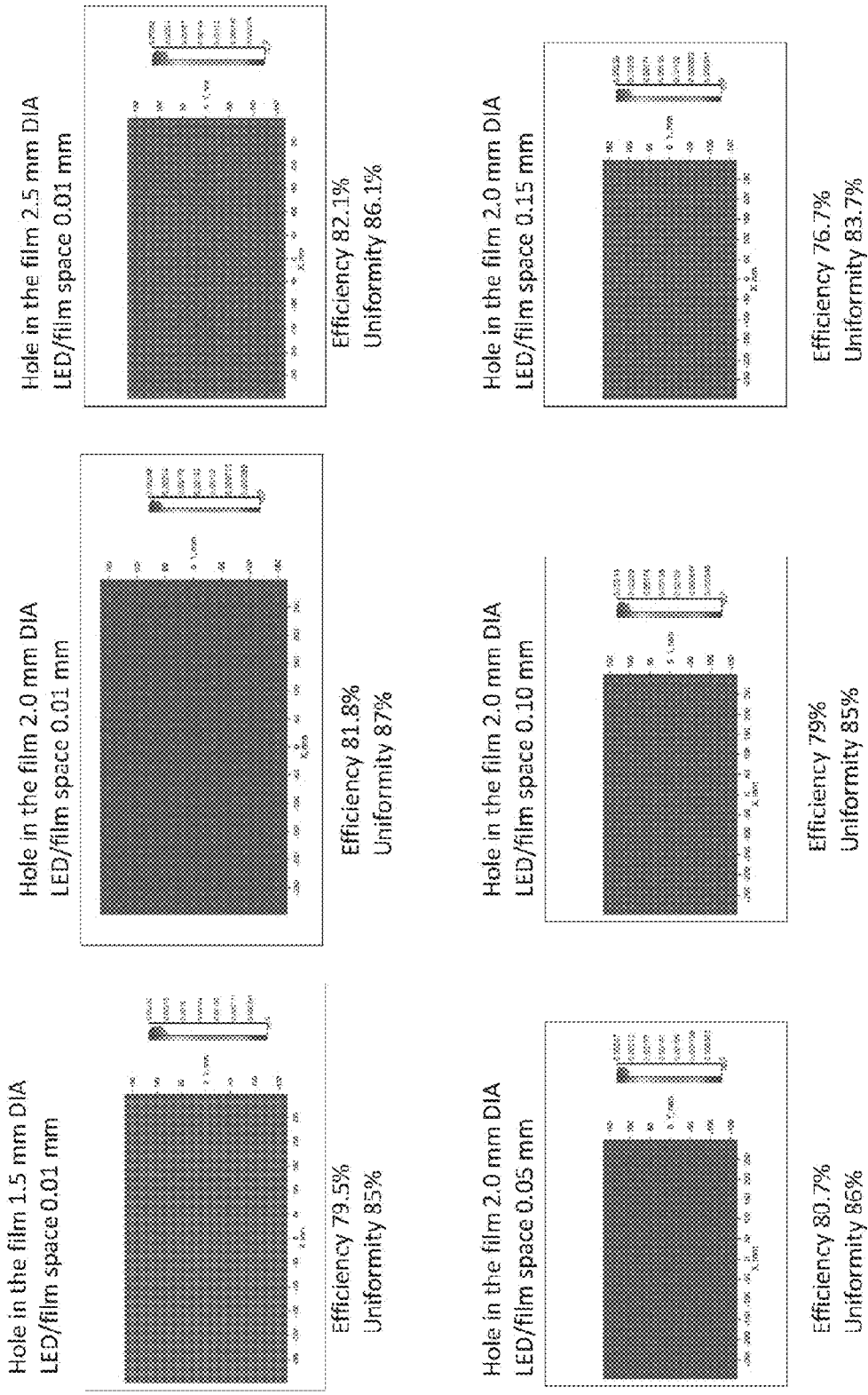
FIG. 8A shows some example illuminance distributions for light emitted from the transmissive diffusing layer of the example BLU of FIGS. 7A-7C for various sizes of the holes in the specular reflective layer and distances between the array of light sources and the specular reflective layer in accordance with certain embodiments described herein.
Figure 8B:
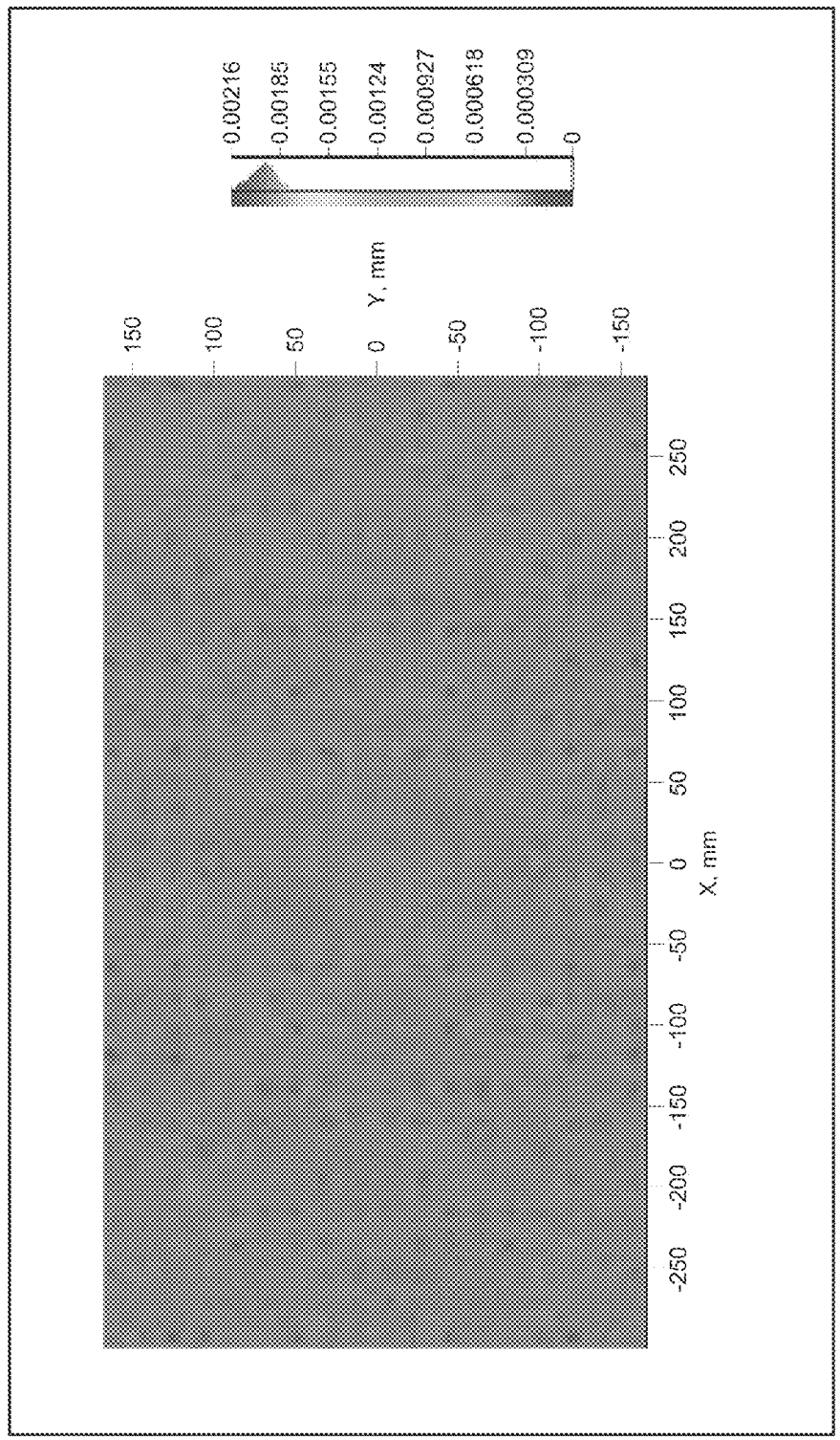
FIG. 8B shows another example illuminance distribution for a BLU having a specular reflective layer in accordance with certain embodiments described herein.

FIG. 8A shows some example illuminance distributions for light emitted from the transmissive diffusing layer 60 of the example BLU 10 for various sizes of the holes 32 in the reflective layer 30 (e.g., diameters in a range of 1.5 mm to 2.5 mm; diameters of 1.5 mm, 2.0 mm, 2.5 mm) and distances between the array 20 of light sources 22 and the reflective layer 30 (e.g., distances in a range of 0.01 mm to 0.15 mm; distances of 0.01 mm, 0.05 mm, 0.10 mm, 0.15 mm) in accordance with certain embodiments described herein. The example illuminance distribution in the upper center position of FIG. 8A corresponds to that of FIG. 7C. FIG. 8A shows that the efficiency and uniformity of the BLU 10 can be adjusted by varying these structural parameters. For example, another simulation using a reflective layer 30 having a specular reflectivity of 98%, a gradient reflective layer 40 having a maximum specular reflectivity of 99% with a distribution of 0.2-mm-diameter transmissive dots can exhibit an illumination distribution on the top of the diffuser having an efficiency of 66.6% and a uniformity of 83%, as shown in FIG. 8B. In certain embodiments, the uniformity (e.g., min/max) of the illuminance distribution can be in a range between 80% and 99%, in a range between 80% and 95%, and/or in a range between 85% and 90%. In certain embodiments, the efficiency of the illuminance distribution can be in a range between 65% and 95%, in a range between 70% and 95%, and/or in a range between 80% and 90%. In certain embodiments, the contrast (e.g., (max−min)/(max+min)) of the illuminance distribution can be in a range between 0 and 0.2, in a range between 0.01 and 0.15, and/or in a range between 0.01 and 0.1.

Figure 9A:
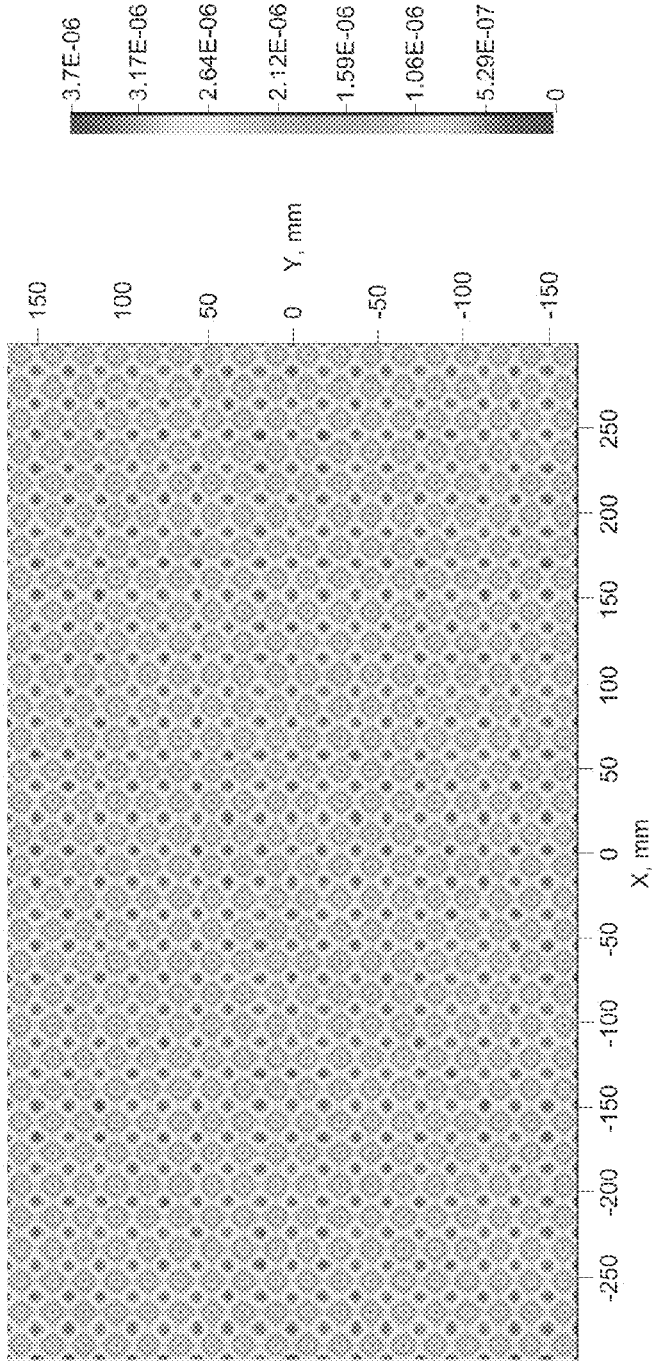
Figure 9C:
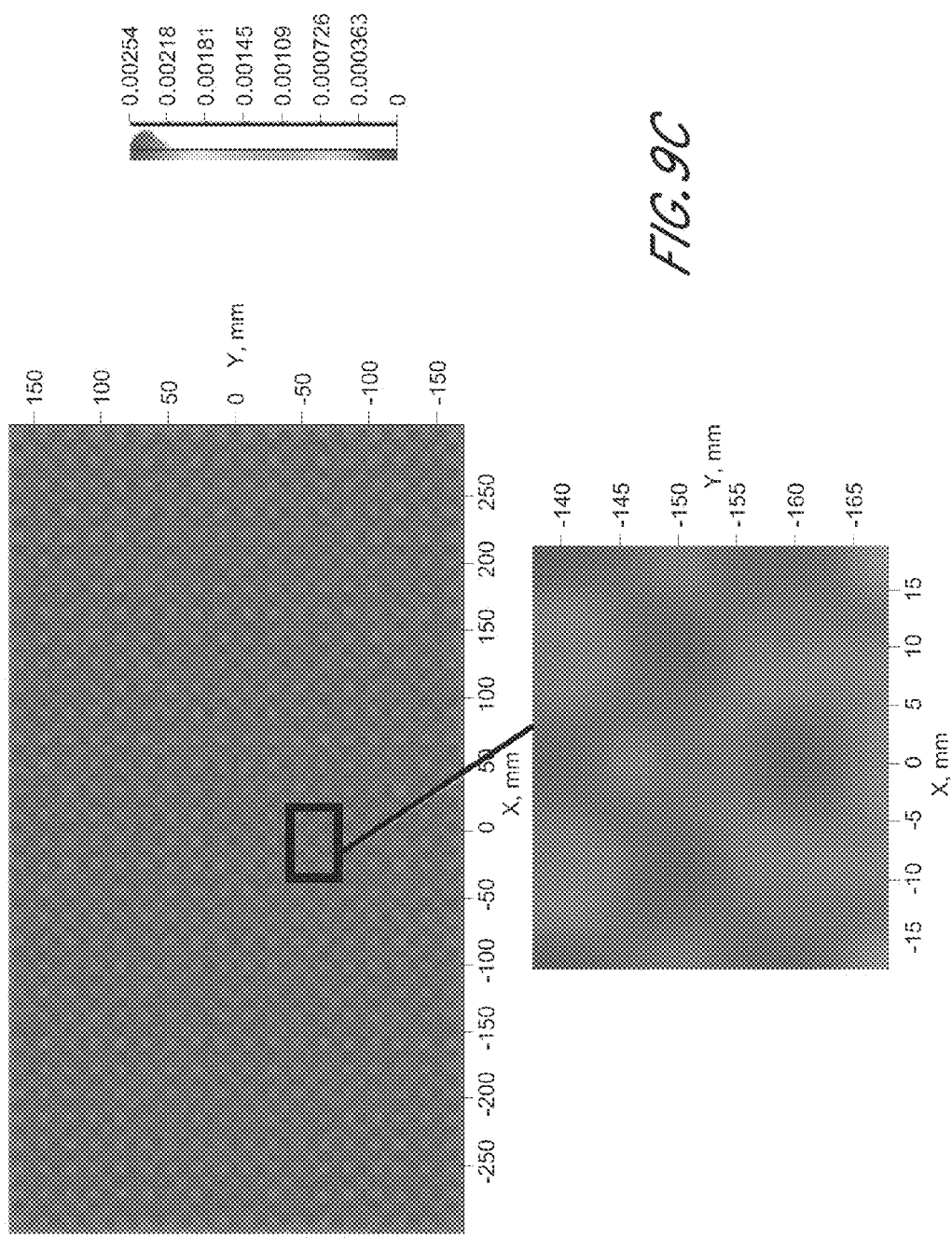

FIGS. 9A-9C show some example simulation data for an example BLU 10 in which the reflective layer 30 comprises a diffusing reflective film in accordance with certain embodiments described herein. The simulation was calculated using a receiver pixel size of 2 mm×2 mm, 28.8 million light rays, computation noise of 4.4%, holes 32 having a 2.0 mm diameter in the reflective layer 30, a distance between the array 20 of light sources 22 (e.g., LEDs) and the reflective layer 30 of 0.1 mm. FIG. 9A is an example transmission distribution and FIG. 9B is an example transmission spatial distribution for an example gradient reflective layer 40 in accordance with certain embodiments described herein. In certain embodiments, as shown in FIGS. 9A-9B, the transmittance can be at relative minima (e.g., lowest) in the brightest spatial regions (e.g., directly over the LED sources 22) and can be at relative maxima (e.g., highest) in the least bright spatial regions (e.g., regions between the LED sources 22).

FIG. 9C shows an example illuminance distribution for light emitted from the transmissive diffusing layer 60 of the example BLU 10 in accordance with certain embodiments described herein. The illuminance distribution of FIG. 9C has a high uniformity (e.g., min/max=87%) and a high efficiency (e.g., 83.7%). Residual non-uniformity visible in FIG. 9C has extremely low contrast (e.g., contrast=(max−min)/(max+min)=0.07) and may be further reduced by tuning the reflection/transmission distribution of the gradient reflective layer 40 across the area of the BLU 10.

Figure 10A:
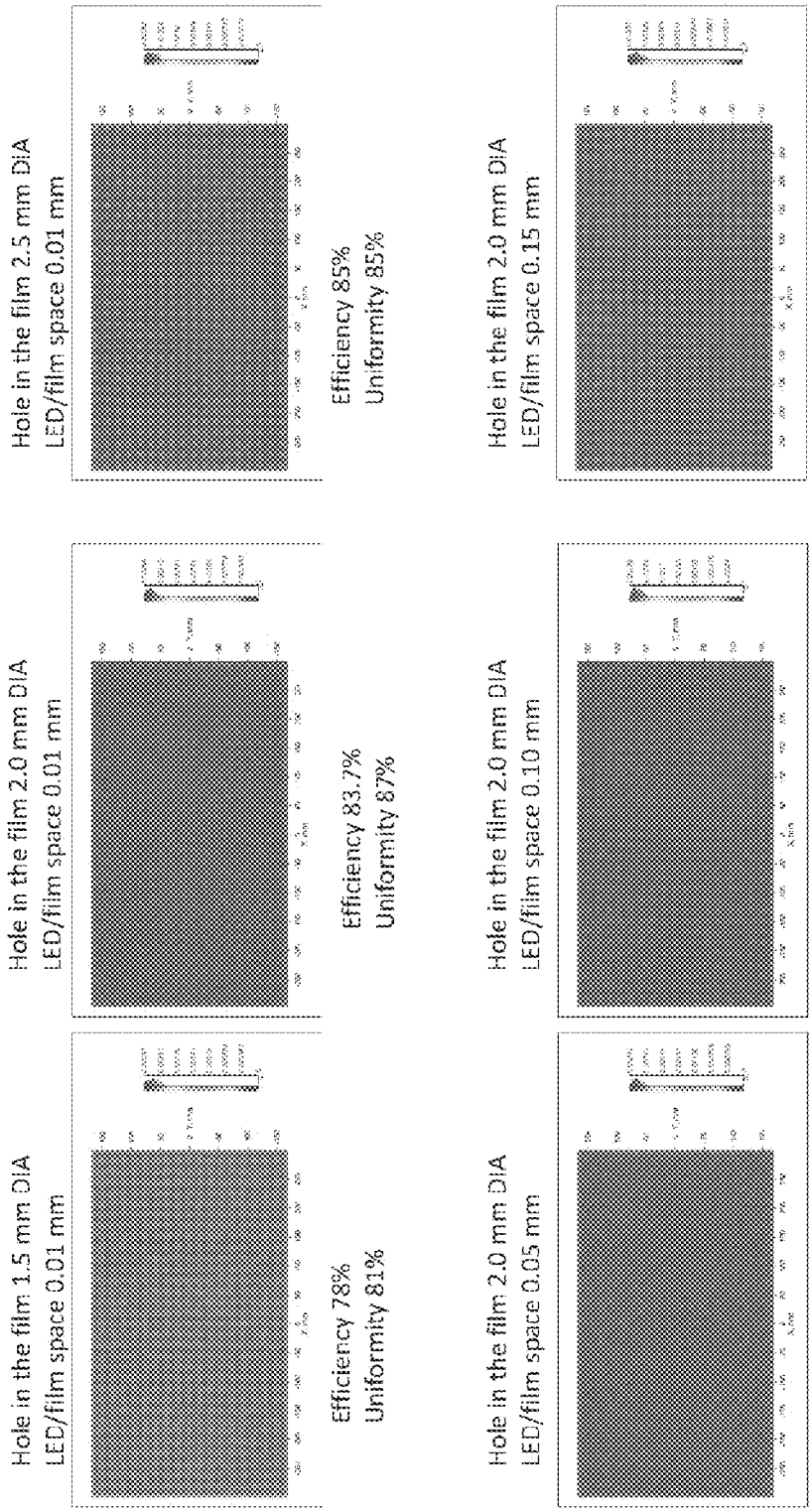
FIG. 10A shows some example illuminance distributions for light emitted from the transmissive diffusing layer of the example BLU of FIGS. 9A-9C for various sizes of the holes in the diffusely reflective layer and distances between the array of light sources and the diffusely reflective layer in accordance with certain embodiments described herein.
Figure 10B:
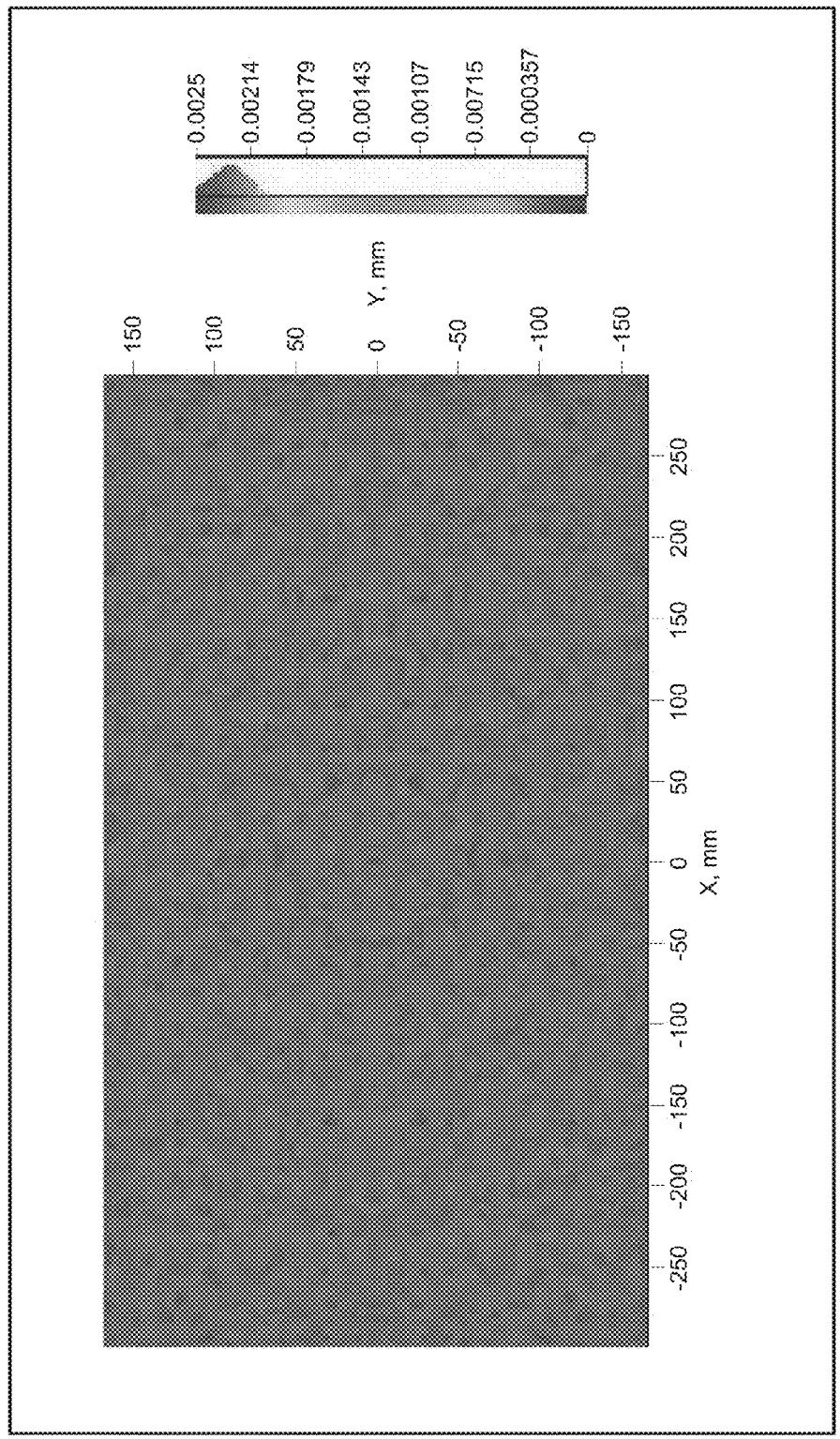
FIG. 10B shows another example illuminance distribution for a BLU having a Lambertian reflective layer in accordance with certain embodiments described herein.

FIG. 10A shows some example illuminance distributions for light emitted from the transmissive diffusing layer 60 of the example BLU 10 for various sizes of the holes in the reflective layer 30 (e.g., diameters in a range of 1.5 mm to 2.5 mm; diameters of 1.5 mm, 2.0 mm, 2.5 mm) and distances between the array 20 of light sources 22 and the reflective layer 30 (e.g., distances in a range of 0.01 mm to 0.15 mm; distances of 0.01 mm, 0.05 mm, 0.10 mm, 0.15 mm) in accordance with certain embodiments described herein. The example illuminance distribution in the upper center position of FIG. 10A corresponds to that of FIG. 9C. FIG. 10A shows that the efficiency and uniformity of the BLU 10 can be adjusted by varying these structural parameters. For example, another simulation using a reflective layer 30 having a Lambertian reflectivity of 98%, a gradient reflective layer 40 having a maximum specular reflectivity of 99% with a distribution of 0.2-mm-diameter transmissive dots can exhibit an illumination distribution on the top of the diffuser efficiency of 78% and a uniformity of 81.4%, as shown in FIG. 10B.

In the foregoing detailed description, reference is made to the accompanying drawings. The illustrative embodiments described herein are not meant to be limiting. Other embodiments can be utilized, and other changes can be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference throughout this disclosure to "one embodiment," "an embodiment," or "in certain embodiments" means that a particular feature, structure, or characteristic described in connection with the embodiment is included in at least one embodiment. Moreover, the appearance of these or similar phrases throughout the specification does not necessarily all refer to the same embodiment, nor are separate or alternative embodiments necessarily mutually exclusive. Various features are described herein which can be exhibited by some embodiments and not by others.

Directional terms used herein (e.g., top, bottom, side, up, down, above, below, etc.) are generally used in this disclosure with reference to the orientation shown in the figures and are not intended to be limiting. For example, while some portions of the apparatus may be described as being "on the bottom" with other portions of the apparatus "above," these terms are intended to provide information regarding the relative positions of these portions to one another and do not imply any absolute orientation with respect to the environment in which the apparatus may be situated.

Unless the context clearly requires otherwise, throughout this disclosure, the words "comprise," "comprising," and the like are to be construed in an inclusive sense, as opposed to an exclusive or exhaustive sense; that is to say, in the sense of "including, but not limited to." The words "coupled" or connected," as generally used herein, refer to two or more elements that may be either directly connected, or connected by way of one or more intermediate elements. Where the context permits, words in this disclosure using the singular or plural number may also include the plural or singular number respectively. The word "or," in reference to a list of two or more items, covers all of the following interpretations of the word: any of the items in the list, all of the items in the list, and any combination of the items in the list.

Moreover, conditional language used herein, such as, among others, "can," "could," "might," "can," "e.g.," "for example," "such as," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are in any way required for one or more embodiments or that one or more embodiments necessarily include logic for deciding, with or without author input or prompting, whether these features, elements, and/or states are included or are to be performed in any particular embodiment.

As used herein, a phrase referring to "at least one of" a list of items refers to any combination of those items, including single members. As an example, "at least one of A, B, or C" is intended to cover: A, B, C, A and B, A and C, B and C, and A and B and C. Conjunctive language such as the phrase "at least one of X, Y, and Z," unless specifically stated otherwise, is otherwise understood with the context as used in general to convey that an item, term, etc. may be at least one of X, Y, or Z. Thus, such conjuctive language is not generally intended to imply that certain embodiments require at least one of X, at least one of Y, and at least one of Z to each be present.

The above detailed description of embodiments is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

What is claimed is:

1. A backlight unit comprising:
an array of light sources configured to emit light;
a reflective member comprising a plurality of holes that allow the light emitted from the array of light sources to propagate through the reflective member; and
a gradient reflective layer that modifies a distribution of light received from the array of light sources and the reflective member, wherein a thickness between the reflective member and the gradient reflective layer is less than or equal to 3 mm.

2. The backlight unit of claim 1, wherein the reflective member comprises a reflective film.

3. The backlight unit of claim 1, further comprising a transmissive diffusing layer configured to diffuse light emitted from the gradient reflective layer propagating towards a receiver.

4. The backlight unit of claim 1, wherein the array of light sources comprises an array of LEDs configured to emit blue light, and the backlight unit further comprises a quantum dot material configured to convert the blue light from the array to white light.

5. The backlight unit of claim 1, wherein the array of light sources comprises a planar array of light-emitting diodes (LEDs) affixed to one or more printed circuit boards.

6. The backlight unit of claim 5, wherein the LEDs are arranged in a rectilinear pattern.

7. The backlight unit of claim 1, wherein each hole of the plurality of holes is positioned above a corresponding one of the light sources of the array and the array of light sources are affixed to one or more printed circuit boards having a surface facing the reflective member, the surface having a reflectivity greater than 90%.

8. The backlight unit of claim 7, wherein the corresponding one of the light sources of the array extends at least partially into said hole.

9. The backlight unit of claim 1, further comprising a frame, wherein the reflective member, the gradient reflective layer, and the frame bound a region through which the light propagates before being emitted from the gradient reflective layer.

10. The backlight unit of claim 9, wherein the frame comprises one or more reflective surfaces bounding at least a portion of the region and the region comprises a hollow cavity.

11. The backlight unit of claim 1, wherein the gradient reflective layer has a transmittance function which varies across an area of the gradient reflective layer.

12. The backlight unit of claim 11, wherein the gradient reflective layer comprises a plurality of features across the area of the gradient reflective layer, the plurality of featured comprising at least one of: a plurality of reflective dots, a plurality of indentations extending partially through a thickness of the gradient reflective layer, a plurality of holes extending completely through the thickness of the gradient reflective layer, or a plurality of protrusions extending from one or both of a first side or a second side of the gradient reflective layer.

13. The backlight unit of claim 11, wherein the gradient reflective layer comprises an array of first regions having a first transmissivity and separated from one another by one or more second regions having a second transmissivity higher than the first transmissivity.

14. The backlight unit of claim 13, wherein the gradient reflective layer comprises a reflective material with a plurality of holes, the first regions having a first density of holes, and the second regions having a second density of holes, the second density higher than the first density.

15. The backlight unit of claim 13, wherein the gradient reflective layer comprises a transmissive material with a plurality of reflective dots, the first regions having a first density of reflective dots, and the second regions having a second density of reflective dots, the second density less than the first density.

16. The backlight unit of claim 13, wherein the first regions are positioned above the light sources.

17. A backlight unit comprising:
an array of light sources configured to emit light;
a reflective member comprising a plurality of holes that allow the light emitted from the array of light sources to propagate through the reflective member; and
a gradient reflective layer that modifies a distribution of light received from the array of light sources and the reflective member, wherein the array of light sources comprises an array of light-emitting diodes (LEDs) configured to emit blue light, and the backlight unit further comprises a quantum dot material configured to convert the blue light from the array to white light.

18. The backlight unit of claim 17, wherein the gradient reflective layer comprises a gradient reflective film.

19. The backlight unit of claim 17, further comprising a transmissive diffusing layer configured to diffuse light emitted from the gradient reflective layer propagating towards a receiver.

20. The backlight unit of claim 17, wherein the array of light sources comprises a planar array of LEDs affixed to one or more printed circuit boards.

21. The backlight unit of claim 20, wherein the LEDs are arranged in a rectilinear pattern.

22. The backlight unit of claim 17, wherein each hole of the plurality of holes is positioned above a corresponding one of the light sources of the array and the array of light sources are affixed to one or more printed circuit boards having a surface facing the reflective member, the surface having a reflectivity greater than 90%.

23. The backlight unit of claim 22, wherein the corresponding one of the light sources of the array extends at least partially into said hole.

24. The backlight unit of claim 17, further comprising a frame, wherein the reflective member, the gradient reflective layer, and the frame bound a region through which the light propagates before being emitted from the gradient reflective layer.

25. The backlight unit of claim 24, wherein the frame comprises one or more reflective surfaces bounding at least a portion of the region and the region comprises a hollow cavity.

26. The backlight unit of claim 17, wherein the gradient reflective layer has a transmittance function which varies across an area of the gradient reflective layer.

27. The backlight unit of claim 26, wherein the gradient reflective layer comprises a plurality of features across the area of the gradient reflective layer, the plurality of featured comprising at least one of: a plurality of reflective dots, a plurality of indentations extending partially through a thickness of the gradient reflective layer, a plurality of holes extending completely through the thickness of the gradient reflective layer, or a plurality of protrusions extending from one or both of a first side or a second side of the gradient reflective layer.

28. The backlight unit of claim 26, wherein the gradient reflective layer comprises an array of first regions having a first transmissivity and separated from one another by one or more second regions having a second transmissivity higher than the first transmissivity.

29. The backlight unit of claim 28, wherein the gradient reflective layer comprises a reflective material with a plurality of holes, the first regions have a first density of holes, and the second regions having a second density of holes, the second density higher than the first density.

30. The backlight unit of claim 28, wherein the gradient reflective layer comprises a transmissive material with a plurality of reflective dots, the first regions have a first density of reflective dots, and the second regions having a second density of reflective dots, the second density less than the first density.

31. The backlight unit of claim 28, wherein the first regions are positioned above the light sources.

32. A method of providing backlight for a display device, the method comprising:
emitting light from an array of light sources;
propagating at least a portion of the light emitted from the array of light sources through holes of a reflective member; and
transmitting at least a portion of the light propagated through the holes of the reflective member through a layer comprising an array of first regions having a first transmissivity and separated from one another by one or more second regions having a second transmissivity higher than the first transmissivity, the first regions positioned above the light sources, wherein a thickness between the reflective member and the layer is less than or equal to 3 mm.

33. A method of providing backlight for a display device, the method comprising:
emitting light from an array of light sources comprising light-emitting diodes configured to emit blue light;
converting the blue light to white light using a quantum dot material;
propagating at least a portion of the light emitted from the array of light sources through holes of a reflective member; and
transmitting at least a portion of the light propagated through the holes of the reflective member through a layer comprising an array of first regions having a first transmissivity and separated from one another by one or more second regions having a second transmissivity higher than the first transmissivity, the first regions positioned above the light sources.

* * * * *